Figure 1:
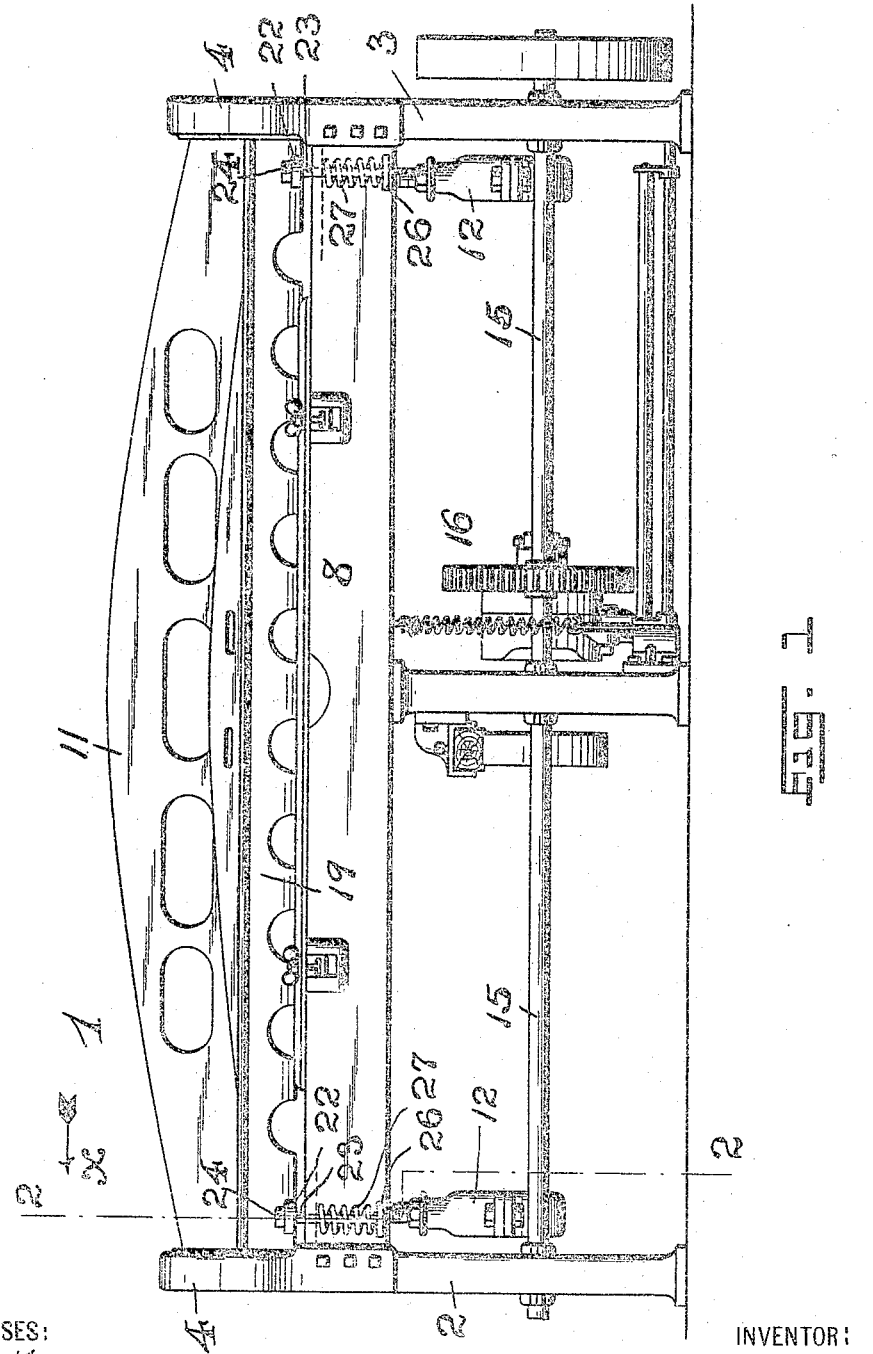

No. 765,953. PATENTED JULY 26, 1904.
A. A. BERGHOF.
MACHINE FOR SHEARING METAL.
APPLICATION FILED OCT. 23, 1903.
NO MODEL. 2 SHEETS—SHEET 1.

WITNESSES:
INVENTOR:
August A. Berghof,
BY
Fred C. Fraentzel,
ATTORNEY

No. 765,953. PATENTED JULY 26, 1904.
A. A. BERGHOF.
MACHINE FOR SHEARING METAL.
APPLICATION FILED OCT. 23, 1903.
NO MODEL. 2 SHEETS—SHEET 2.

WITNESSES:
W. B. Fraentzel
Geo. D. Richards

INVENTOR:
August A. Berghof,
BY
Fred K. Fraentzel
ATTORNEY

No. 765,953. Patented July 26, 1904.

UNITED STATES PATENT OFFICE.

AUGUST A. BERGHOF, OF NEWARK, NEW JERSEY, ASSIGNOR TO GEORGE A. OHL & CO., A CORPORATION OF NEW JERSEY.

MACHINE FOR SHEARING METAL.

SPECIFICATION forming part of Letters Patent No. 765,953, dated July 26, 1904.

Application filed October 23, 1903. Serial No. 178,169. (No model.)

*To all whom it may concern:*

Be it known that I, AUGUST A. BERGHOF, a citizen of the United States, residing at Newark, in the county of Essex and State of New Jersey, have invented certain new and useful Improvements in Machines for Shearing Metal; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The present invention relates to improvements in shears, and more especially to that class of shearing-machines which are driven by power for the purposes of cutting or shearing metal into strips or plates of different widths and thicknesses, and hence are subject to sudden strains and jars during the shearing or cutting operations when the metal which is to be cut is heavy.

The primary object of the present invention is to provide an improved machine known to the trade as a "power squaring-shears" and of the general character of machine set forth in United States Letters Patent No. 680,937 and dated August 20, 1901, with a view of simplifying the general arrangement of the parts set forth in said patent and dispensing with the use of some of the parts.

A further object of this invention is to provide a novel arrangement of clamping-leaf which is automatically brought down upon the sheet of metal which is to be cut, being held thereon by the action of a spring or springs while the shearing-head and its cutter are moving downward through the metal, the said clamping-leaf being lifted from its holding or clamping relation with the metal sheet by contact with a supporting or lifting means connected directly with the said shearing-head during the upward or return movement of the said shearing-head.

A further object of this invention is to provide between the said lifting device or means of the shearing-head and the portion of the clamping-leaf with which said lifting device or means is brought in engagement a means of adjustment, so as to adjust the positions of the clamping-leaf with relation to different thicknesses of sheet metal to be sheared or cut and also to regulate the times of the lifting engagement between the knife or shearing-head and the said clamping-leaf.

This invention consists, therefore, in the various arrangements and combinations of the devices and the details of the construction of the same, all of which will be hereinafter more fully described and then finally embodied in the clauses of the claim, which are appended to and form an essential part of the same.

The invention is clearly illustrated in the accompanying drawings, in which—

Figure 2:
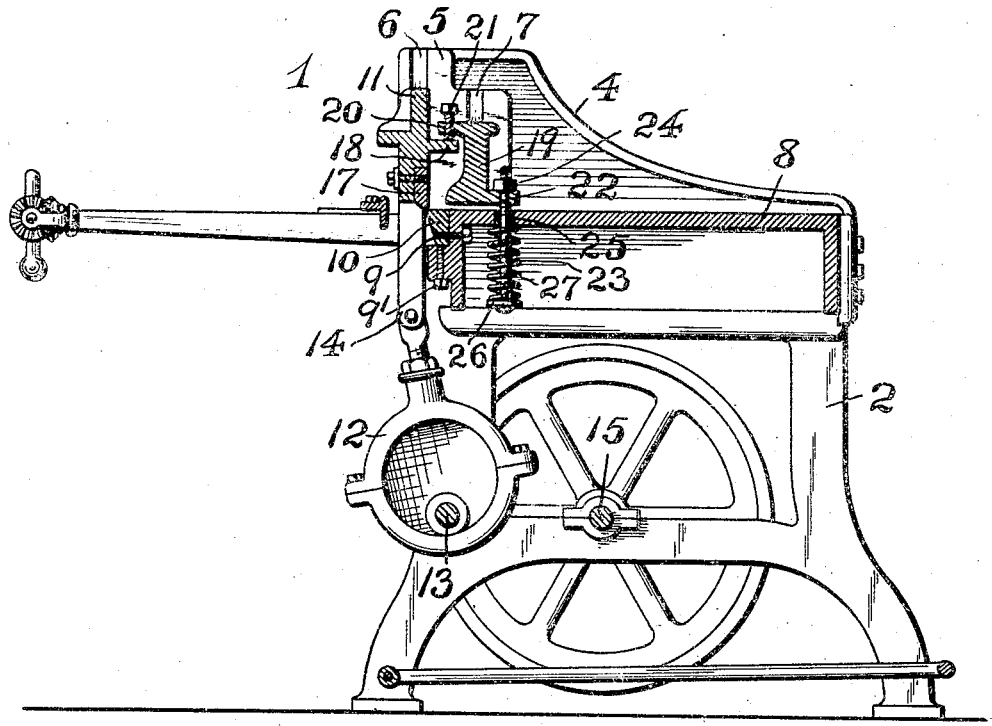
Figure 3:
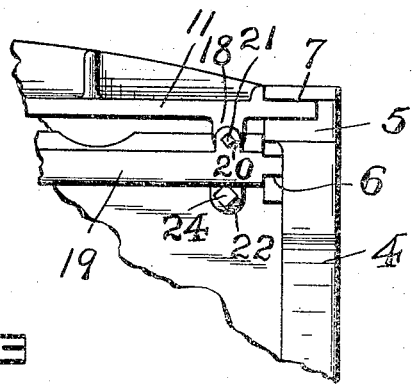

Figure 1 is a front elevation of a power-shears or a cutting apparatus embodying the principles of the present invention; and Fig. 2 is a transverse vertical section of the same, the said section being taken on line 2 2 in said Fig. 1 looking in the direction of the arrow *x*. Fig. 3 is a plan or top view of a portion of the bed or table of the machine and the end portions of the shearing-head and clamping-leaf movably arranged in guides, the said view illustrating also in plan the arrangement of one of the lifting or supporting devices connected with the shearing-head and the parts of the clamping-leaf with which the same is brought in operative engagement, the said view also representing an arrangement of perforated ear or lug in which is arranged a spring-encircled rod or bolt for the purpose of cushioning the downward movement of the clamping-leaf and also for positively holding the said clamping-leaf in its lowered position upon the piece of sheet metal while the latter is being sheared.

Similar characters of reference are employed in the said views to indicate corresponding parts.

Referring now to the said drawings, the reference character 1 indicates a complete power-shears of the general construction and character of machine illustrated and described in the said Letters Patent No. 680,937. This machine comprises a pair of end standards 2 and 3, each standard being provided with the upwardly-extending portion or member 4, provided with a guide plate or portion 5, having vertical channels or grooves 6 and 7, forming guides, substantially as represented in Figs. 2 and 3 of the drawings and for the purposes to be presently described. Suitably secured between the inner faces of the said standards 2 and 3 and preferably in the manner illustrated and described in said Patent No. 680,937 is a work-supporting or shearing bed or table 8. Adjustably secured to the rear edge of the said bed or table 8 by means of the screws or bolts 9 and 9' is the lower shearing member or knife-blade 10. Movably arranged in the guides 6 of the members or guide-plates 5 of the respective standards 2 and 3 are the end portions of a shearing-head 11, the said shearing-head being of the general construction set forth in said Patent No. 680,937 and being caused to reciprocate in said guides 6 by means of eccentrics 12, arranged upon a counter-shaft 13, and links 14 between said eccentrics and portions of the shearing-head 11 in the manner set forth in the said Letters Patent above mentioned. The said counter-shaft 13 is actuated from the main driving-shaft 15 preferably by means of the mechanism 16, (illustrated in Fig. 1 of the drawings,) the said mechanism being constructed and arranged as set forth in said Patent No. 680,937. The said shearing-head 11 has secured along its lower edge the shearing blade or knife 17, and at or near the respective ends of the shearing-head the latter is formed with forwardly-extending supporting and lifting devices, preferably made in the form of lugs, extensions, or shoulders 18, as clearly illustrated in said Figs. 2 and 3 of the drawings. Slidably arranged in the previously-mentioned guides 7 of the guide members 5 are the respective end portions of a clamping-leaf 19, the clamping-leaf being of the general construction of clamping-leaf set forth in the said Patent No. 680,937 and being provided along its upper edge with projections or lugs 20, extending in alinement above the lugs or projections 18 of the shearing-head, and being provided with screw-threaded holes for the reception of suitable adjusting-screws 21, which are screwed in said holes and have their lower ends resting upon the upper faces of said lugs or projections 18, as shown. In this manner when the shearing-head is in its raised position the said clamping-leaf is suspended, by means of the said adjusting-screws 21, from the lugs or projections 18 of the shearing-head, and the said clamping-leaf moves up and down simultaneously with the movements of the said shearing-head 11, the end portions of the clamping-leaf moving in the guides 7, and thereby preventing the displacement of said screws 21 from the said lugs or projections 18 and maintaining the operative relation between the said shearing-head 11 and the clamping-leaf 19, as will be clearly evident.

That the lower holding-surface of the clamping-leaf may be positively retained in its clamping position upon the piece of metal to be cut during the shearing or cutting operations the said clamping-leaf 19 is provided near its end portions and along its lower edge with perforated receiving lugs, shoulders, or projections 22. In each lug, shoulder, or projection 22 is retained, by means of an adjusting nut, head, or other suitable enlargement 24, a bolt or rod 23, each bolt or rod extending through a suitably-disposed opening or hole 25 in the bed or table 8 and having affixed upon the lower end of each bolt in any suitable manner a plate or washer-disk 26. Encircling that portion of each bolt or rod 23 between the disks or plate 26 and the under surface of the bed or table 8 is a spring 27, each spring 27 having its coils normally under compression, so as to tend in drawing the clamping-leaf 19 in a downward direction and when upon the piece of sheet metal which is to be cut positively causing the holding or clamping relation between the lower surface of the clamping-leaf 19 and the said piece of sheet metal, as will be clearly understood. Furthermore, during the rapid upward and downward movements of both the said shearing-head and the clamping-leaf the action of the coils of the springs 27 is such that the clamping-leaf cannot be jarred from its suspended relation with the shearing-head, with which it is loosely and separably connected, and at all times a smoothly-working and operative means of connection between these parts is clearly the result.

From the foregoing description of the present invention it will be seen that the mechanism for operating the clamping-leaf has been greatly simplified and that the various bearings, a long shaft, links, and a connecting-rod employed in said Letters Patent No. 680,937 have all been dispensed with, whereby the cost of manufacture in labor and material have both been greatly reduced and a much stronger and neater machine in which there are fewer working parts, and hence less likelihood of the parts getting out of order, is the result.

Of course I am aware that changes may be made in the various arrangements and combinations of the devices and their parts without departing from the scope of my present invention. Hence I do not limit my invention to the exact arrangements and combinations of the parts as described in the foregoing specification and as illustrated in the accompanying drawings, nor do I confine myself to the exact details of the construction of the said parts.

Having thus described my invention, what I claim is—

1. In a machine for cutting sheet metal, the combination, with a bed or table and standards comprising guide members, of a shearing-head and cutter and supporting-lugs extending from said shearing-head, mechanism for causing a reciprocatory motion of said shearing-head and cutter, a clamping-leaf, and lugs on said clamping-leaf, said supporting-lugs on said shearing-head being in separable and lifting engagement with the lugs of said clamping-leaf, substantially as and for the purposes set forth.

2. In a machine for cutting sheet metal, the combination, with a bed or table and standards comprising guide members, of a shearing-head and cutter and supporting-lugs extending from said shearing-head, mechanism for causing a reciprocatory motion of said shearing-head and cutter, a clamping-leaf, and lugs on said clamping-leaf, said supporting-lugs on said shearing-head being in separable and lifting engagement with the lugs of said clamping-leaf, and adjusting-screws connected with the lugs of the clamping-leaf, substantially as and for the purposes set forth.

3. In a machine for cutting sheet metal, the combination, with a bed or table and standards comprising guide members, of a shearing-head and cutter, mechanism for causing a reciprocatory motion of said shearing-head and cutter, a clamping-leaf suspended from said shearing-head, and a cushioning means connected with said clamping-leaf, consisting, essentially, of perforated lugs connected with said clamping-leaf, a bolt in each lug, said bolts extending through correspondingly-arranged openings in the bed or table, a plate on the lower end of each bolt, and a spring encircling each bolt between the said plate and the lower surface of the bed or table, substantially as and for the purposes set forth.

4. In a machine for cutting sheet metal, the combination, with a bed or table and standards comprising guide members, of a shearing-head and cutter, mechanism for causing a reciprocatory motion of said shearing-head and cutter, a clamping-leaf suspended from and adjustably connected with said shearing-head, and a cushioning means connected with said clamping-leaf, consisting, essentially, of perforated lugs connected with said clamping-leaf, a bolt in each lug, said bolt extending through correspondingly-arranged openings in the bed or table, a plate on the lower end of each bolt, and a spring encircling each bolt between the said plates and the lower surface of the bed or table, substantially as and for the purposes set forth.

5. In a machine for cutting sheet metal, the combination, with a bed or table and standards comprising guide members, of a shearing-head and cutter, and supporting-lugs extending from said shearing-head, mechanism for causing a reciprocatory motion of said shearing-head and cutter, a clamping-leaf, and lugs on said clamping-leaf, said supporting-lugs on said shearing-head being in separable and lifting engagement with the lugs of said clamping-leaf, and a cushioning means connected with said clamping-leaf, consisting, essentially, of perforated lugs connected with said clamping-leaf, a bolt in each lug, said bolts extending through correspondingly-arranged openings in the bed or table, a plate on the lower end of each bolt, and a spring encircling each bolt between the said plate and the lower surface of the bed or table, substantially as and for the purposes set forth.

6. In a machine for cutting sheet metal, the combination, with a bed or table and standards comprising guide members, of a shearing-head and cutter, and supporting-lugs extending from said shearing-head, mechanism for causing a reciprocatory motion of said shearing-head and cutter, a clamping-leaf, and lugs on said clamping-leaf, said supporting-lugs on said shearing-head being in separable and lifting engagement with the lugs of said clamping-leaf, adjusting-screws connected with the lugs of the clamping-leaf, and a cushioning means connected with said clamping-leaf, substantially as and for the purposes set forth.

7. In a machine for cutting sheet metal, the combination, with a bed or table and standards comprising guide members, of a shearing-head and cutter, and supporting-lugs extending from said shearing-head, mechanism for causing a reciprocatory motion of said shearing-head and cutter, a clamping-leaf, and lugs on said clamping-leaf, said supporting-lugs on said shearing-head being in separable and lifting engagement with the lugs of said clamping-leaf, adjusting-screws connected with the lugs of the clamping-leaf, and a cushioning means connected with said clamping-leaf, consisting, essentially, of perforated lugs connected with said clamping-leaf, a bolt in each lug, said bolts extending through correspondingly-arranged openings in the bed or table, a plate on the lower end of each bolt, and a spring encircling each bolt between the said plate and the lower surface of the bed or table, substantially as and for the purposes set forth.

8. In a machine for cutting sheet metal, the combination, with a bed or table and standards comprising guide members, of a reciprocatory clamping-leaf, and a spring-actuated means connected with said clamping-leaf for causing a positive clamping action of the said leaf, consisting, essentially, of perforated lugs connected with said clamping-leaf, a bolt in each lug, said bolts extending through correspondingly-arranged openings in the bed or table, a plate on the lower end of each bolt, and a spring encircling each bolt between the said plate and the lower surface of the bed or table, substantially as and for the purposes set forth.

9. The herein-described shearing-machine, comprising, a bed or table provided with openings 25, standards between which said bed or table is supported, guide members connected with said standards, a shearing-head slidably arranged in one set of said guide members, a shaft, eccentrics on said shaft, and link connections between said eccentrics and said shearing-head, a cutter connected with said shearing-head, supporting-lugs extending from the said shearing-head, a clamping-leaf slidably arranged in another set of said guide members, lugs on said clamping-leaf, and adjusting-screws connected with said lugs, said screws being in adjustable supporting engagement with the lugs of said shearing-head, a second set of perforated lugs on said clamping-leaf, and a spring-actuated means connected with each one of said perforated lugs for causing a positive clamping action of the said clamping-leaf, consisting, essentially, of a bolt in each perforated lug of the clamping-leaf, each bolt extending through an opening 25 in the bed or table, a plate upon the lower end of each bolt, and a spring encircling each bolt between the said plate and the lower surface of the bed or table, substantially as and for the purposes set forth.

In testimony that I claim the invention set forth above I have hereunto set my hand this 21st day of October, 1903.

AUGUST A. BERGHOF.

Witnesses:
FREDK. C. FRAENTZEL,
JOHN S. LA BAR.